US010241381B2

(12) United States Patent
Chiu et al.

(10) Patent No.: US 10,241,381 B2
(45) Date of Patent: Mar. 26, 2019

(54) MOBILE DEVICE WITH VARIABLE APERTURE FUNCTION

(71) Applicant: ISSA Technology Co., Ltd., Taoyuan (TW)

(72) Inventors: Chi-Wei Chiu, Taoyuan (TW); Yung-Yun Chen, Taoyuan (TW)

(73) Assignee: ISSA TECHNOLOGY CO., LTD., Taoyuan (TW)

( * ) Notice: Subject to any disclaimer, the term of this patent is extended or adjusted under 35 U.S.C. 154(b) by 0 days.

(21) Appl. No.: 15/855,564

(22) Filed: Dec. 27, 2017

(65) Prior Publication Data

US 2019/0018303 A1    Jan. 17, 2019

(30) Foreign Application Priority Data

Jul. 13, 2017    (TW) .............................. 106123480 A

(51) Int. Cl.
| G03B 9/02 | (2006.01) |
| G03B 9/08 | (2006.01) |
| G03B 9/42 | (2006.01) |
| G03B 9/24 | (2006.01) |
| G03B 9/58 | (2006.01) |

(52) U.S. Cl.
CPC .................. G03B 9/02 (2013.01); *G03B 9/08* (2013.01); *G03B 9/24* (2013.01); *G03B 9/42* (2013.01); *G03B 9/58* (2013.01)

(58) Field of Classification Search
CPC ....................................................... G03B 9/42
USPC ......................................................... 396/450
See application file for complete search history.

(56) References Cited

U.S. PATENT DOCUMENTS

| 4,884,091 | A | * | 11/1989 | Nakagomi | ............... G03B 9/02 396/505 |
| 5,749,015 | A | * | 5/1998 | Sato | ....................... G03B 7/085 396/508 |
| 5,907,733 | A | * | 5/1999 | Hara | ....................... G03B 9/02 348/E5.028 |
| 6,533,473 | B1 | * | 3/2003 | Edamitsu | ................. G03B 9/08 348/362 |
| 7,316,514 | B2 | * | 1/2008 | Naganuma | ............... G03B 9/14 396/450 |
| 2003/0079472 | A1 | * | 5/2003 | Hara | ........................ F02G 1/04 60/527 |
| 2005/0226611 | A1 | * | 10/2005 | Kawaguchi | ............. G03B 9/02 396/505 |

(Continued)

*Primary Examiner* — Clayton E Laballe
*Assistant Examiner* — Kevin Butler
(74) *Attorney, Agent, or Firm* — Muncy, Geissler, Olds & Lowe, P.C.

(57) ABSTRACT

A mobile device with variable aperture function includes two driving members, which deformation and retraction can be controlled to cause movement of a light hole of a movable aperture sheet towards a camera lens, where the amount of light entering into the camera lens is determined by the light hole of the movable aperture sheet and when the light hole in the movable aperture sheet moves away from the camera lens, the amount of light entering into the camera lens is determined by the camera lens itself, thereby varying the amount of light entering into the camera lens and eliminating the fixed amount of light due to the fixed aperture of the prior art mobile device and permitting miniaturization of the present mobile device.

14 Claims, 5 Drawing Sheets

(56) References Cited

U.S. PATENT DOCUMENTS

| | | | | |
|---|---|---|---|---|
| 2007/0098399 A1* | 5/2007 | Yasunaga | ................ | G03B 9/02 |
| | | | | 396/508 |
| 2007/0297792 A1* | 12/2007 | Hayakawa | ............... | G03B 9/06 |
| | | | | 396/508 |
| 2009/0003824 A1* | 1/2009 | Yasunaga | ................ | G03B 9/02 |
| | | | | 396/508 |
| 2009/0153937 A1* | 6/2009 | Numnual | ................ | G03B 9/02 |
| | | | | 359/233 |
| 2011/0255185 A1* | 10/2011 | Hashi | ....................... | G02B 7/08 |
| | | | | 359/824 |
| 2012/0020657 A1* | 1/2012 | Murakami | ............... | G03B 9/14 |
| | | | | 396/489 |
| 2014/0285905 A1* | 9/2014 | Zhou | ....................... | G03B 5/02 |
| | | | | 359/696 |

* cited by examiner

MOBILE DEVICE WITH VARIABLE APERTURE FUNCTION

BACKGROUND OF THE INVENTION

1. Field of the Invention

The present invention relates generally to a mobile device, and more particularly to a mobile device (such as a smart phone) that includes a movable aperture sheet, which movement can be controlled with respect to a camera lens of the mobile device in order to determine an amount of light passing through the camera lens.

2. The Prior Arts

Due to advance of smart phones and since every single smart phone has camera recording function, majority of smart phone users change their habit of taking pictures with their smart phone instead of the conventional camera, which has no phone function. With the constant production of new smart phones, the smart phone manufacturers emphasize the promotion of the highest pixel resolution and the large aperture function of the new smart phone. It is noted that few people understand that the aperture of camera attached in the smart phone is constant.

The enlargement and reduction of the aperture is achieved by the movement of the diaphragm blades controlled by a driving motor. Since the smart phone is in the trend of miniaturization in size and weight, installation of a motor for activation of the diaphragm blades is impossible even if other optical components are not taken into account. The motor to be installed has limited power and the dissipation of heat resulted from the other components associated with the motor should also be considered. In short, the receiving and heat dissipation spaces of the smart phone must be increased and is against the main production process of the smart phone. Therefore, presently the aperture value of the camera unit in the smart phone is constant in order to economize the space for receiving and installing of components therein.

In addition to the large space occupied by the driving motor and high power consumption by the driving motor, the aperture structure of the camera lens also occupies a substantial space. For instance, the aperture value of an iris diaphragm is adjusted by changing the dimension of diaphragm blades such that once the virtual shutter release button is touched, the diaphragm blades open or close depending on the aperture value setting. As a matter of fact, the shuttle structure defining the aperture is usually made up of a plurality of diaphragm blades one overlapping the other such that the diaphragm blades open or close depending on the aperture value setting selected. To be more specific, the overlapping diaphragm blades still occupy a certain extent of space even though they are relatively thin and hence the lens itself may protrude outwardly from the phone body such that scratching on the lens is still possible. In other words, an adjustable aperture disposed in a smart phone nowadays is still impossible.

SUMMARY OF THE INVENTION

A primary objective of the present invention is to provide a mobile device that has the variable aperture function without utilizing a set of diaphragm blades constituting the aperture structure and a motor for driving the diaphragm blades. Hence, the camera diaphragm of the mobile device is simple in structure and does not hinder the miniaturization of the mobile device of the present invention.

A secondary objective of the present invention is to provide a mobile device, in which a camera lens can switch to provide different aperture settings. The mobile device of the present invention includes a camera lens having at least one first light hole; a base disposed to an exterior of the camera lens; a driving mechanism including two driving members and a movable aperture sheet, wherein each of the driving members has an end fixed on the base adjacent to two opposite end portions of the base and the other end connected to the movable aperture sheet in such a manner that the movable aperture sheet is formed with a second light hole.

In one aspect, a mobile device with variable aperture function of the present invention, includes: a camera lens having at least one first light hole; a base disposed exteriorly to the camera lens and having at least two opposite end portions; a driving mechanism including two driving members and a slidable plate, wherein each of the driving members has an end fixed on the base adjacent to the two opposite end portions thereof and the other end connected to the slidable plate in such a manner that the slidable plate is located on the base between the two opposite end portions; and a movable aperture sheet connected to the slidable plate and being formed with at least one second light hole.

In the abovementioned embodiments, activation of one of the driving members results in deformation of the one of the driving members, which in turn, causes movement of the slidable plate and movable aperture sheet toward the camera lens, thereby aligning the second light hole in the movable aperture sheet with the first hole in the camera lens, and activation of the other one of the driving members results in deformation of the other one of the driving members, which in turn, causes movement of the slidable plate and movable aperture sheet away from the camera lens, thereby staggering the second light hole in the movable aperture sheet with the first light hole in the camera lens; wherein, the second light hole has a diameter different from that of the first light hole.

In one embodiment of the present invention, the second light hole has a diameter smaller than that of the first light hole.

Therefore, when the second light hole in the movable aperture sheet is aligned with the first light hole in the camera lens, the light only passes through the second light hole. In other word, at this time, the second light hole determines the amount of light passing through the second light hole. When the second light hole is staggered with the first light hole in the camera lens, the first light hole determines the amount of light passing through first light hole.

Due to having different diameter between the second light hole and the first light hole and by controlling movement of the movable aperture sheet, the amount of light entering into the camera lens can be varied, thereby varying the depth of field and enhancing the photo-taking ability of the camera lens in the mobile device of the present invention.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
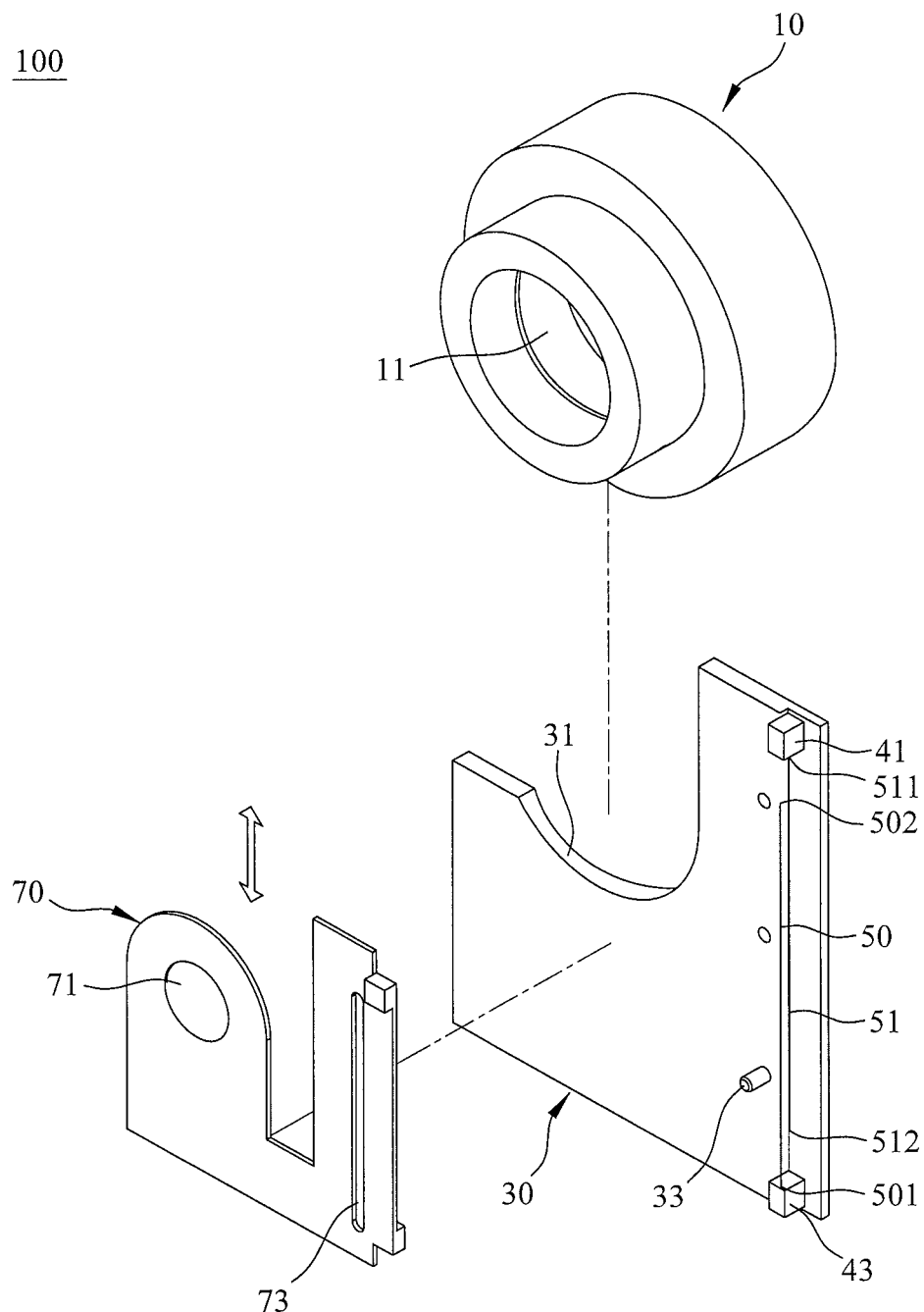
FIG. 1 shows components of a first embodiment of the present invention.

FIG. 1 shows a mobile device 100 with variable aperture function according to the first embodiment of the present invention, including a camera lens 10, a base 30, two driving members 50, 51 and a movable aperture sheet 70.

The entire camera lens 10 may be disposed within a mobile device, or a part of the camera lens 10 is exposed to an exterior of the mobile body and the remaining part of the camera lens 10 is disposed inside of the mobile body. The camera lens 10 has at least a first light hole 11 to permit passing of a light. It is noted that the camera lens 10 is a traditional shooting lens with constant aperture used in common mobile electrical device or tablet device, that is to say the dimension of the aperture cannot be varied.

The base 30 is disposed exteriorly to, such as at an upper, lower, front or rear side of the camera lens 10, and has at least two opposite end portions. To be more specific, the base 30 may support the camera lens 10 directly or indirectly thereon and further defines a reception recess 31 upon which the camera lens 10 is seated.

In the first embodiment, each of the driving members 50, 51 has an end 501, 511 fixed on one side surface of the base 30 adjacent to the two opposite end portions thereof and the other end 502, 512 connected to the movable aperture sheet 70 in such a manner that the movable aperture sheet 70 is located on the side surface of the base 30 between the two opposite end portions. The movable aperture sheet 70 is formed with at least one second light hole 71.

Preferably, the movable aperture sheet 70 is formed with an elongated slide slot 73 adjacent to one lateral side thereof while the base 30 is provided with a guiding stub 33 extending into the slide slot 73 such that the movable aperture sheet 70 is movable reciprocally and limitedly on the base 30 along the slide slot 73.

Figure 2:
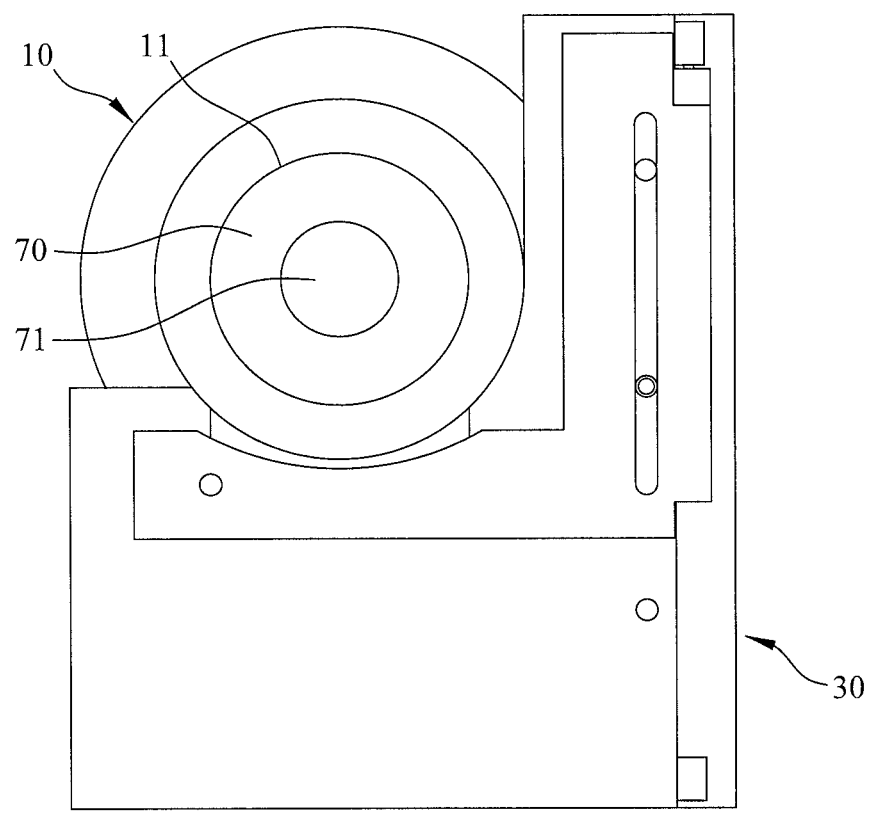
FIG. 2 illustrates movement of a movable aperture sheet relative to a camera lens in the mobile device according to the first embodiment of the present invention.

After assembly, activation of one driving unit 50 results in deformation of the driving unit 50, which in turn, causes movement of the movable aperture sheet 70 toward the camera lens 10, thereby aligning the second light hole 71 in the movable aperture sheet 70 with the first light hole 11 in the camera lens 10, and activation of the other driving unit 51 results in deformation of the other driving unit 51, which in turn, causes movement of the movable aperture sheet 70 away from the camera lens 10 as best shown in FIG. 2, thereby staggering the second light hole 71 in the movable aperture sheet 70 with the first light hole 11 in the camera lens 10.

In this embodiment, the second light hole 71 has a diameter different from that of the first light hole 11 such that when the second light hole 71 is aligned with the first light hole 11, the light only passes through the second light hole 71. Therefore, even when the second light hole 71 is disposed exteriorly of the camera lens 10, the light can still pass through the first light hole 11. Hence when the second light hole 71 of the movable aperture sheet 70 corresponds to the camera lens 10, the light enters into the camera lens through the second light hole 71. Because the diameters of the first and second light holes 11, 71 are different from each other, the amount of light entering into the camera lens of the mobile device of the present invention differs from each other. In other words, two different amounts of light can enter into the camera lens of the mobile device and hence providing different depths of field or shuttering mode.

Figure 3:
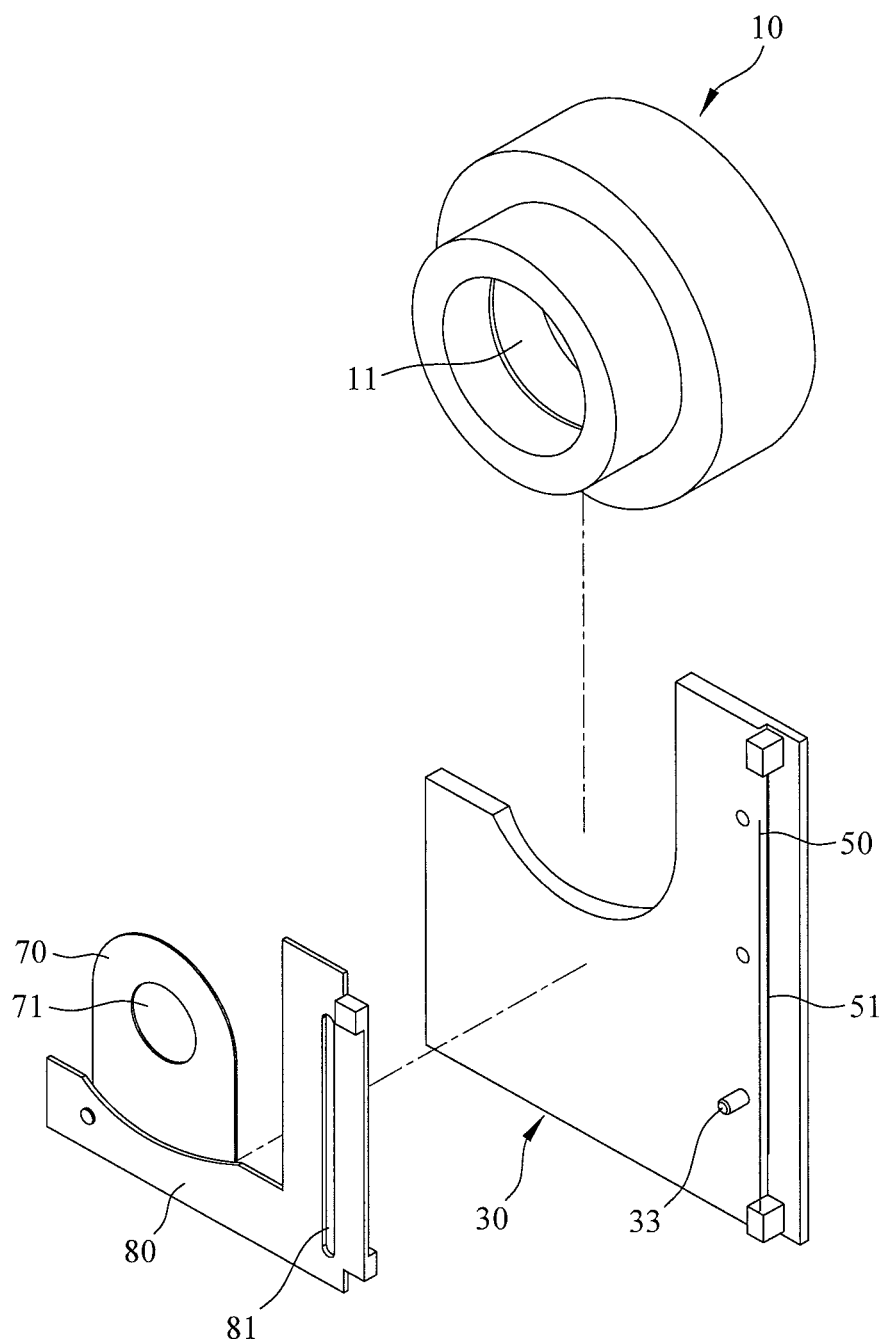
FIG. 3 shows components of a second embodiment of the present invention.

FIG. 3 shows components employed in a mobile device according to a second embodiment of the present invention. The second embodiment is similar to the first embodiment in structure, the driving mechanism further includes a slidable plate 80 in addition to the two driving members 50, 51, wherein each of the driving members 50, 51 has an end fixed on the base 30 adjacent to the two opposite end portions thereof and the other end connected to the slidable plate 80 in such a manner that the slidable plate 80 is located on the base 30 between the two opposite end portions. In particular, the movable aperture sheet 70 is coupled to the slidable plate 80 and is formed with at least one second light hole 71 such that the movable aperture sheet 70 is connected and located side-by-side with or adjacent to the slide plate 80.

Preferably, the slide plate 80 is formed with an elongated slide slot 81 adjacent to one lateral side thereof while the base 30 is provided with a guiding stub 33 extending into the slide slot 81 such that the movable aperture sheet 70 is movable reciprocally on the base 30 along the slot 81. The above slide slot 81 is linear or may have other suitable configuration.

After assembly, activation of one of the driving members 50 results in deformation of the one of the driving members 50, which in turn, causes movement of the slidable plate 80 and the movable aperture sheet 70 toward the camera lens 10, thereby aligning the second light hole 71 in the movable aperture sheet 70 with the first light hole 11 in the camera lens 10, and activation of the other one of the driving members 51 results in deformation of the other one of the driving members 51, which in turn, causes movement of the slidable plate 80 and the movable aperture sheet 70 away from the camera lens 10, thereby staggering the second light hole 71 in the movable aperture sheet 70 with the first light hole 11 in the camera lens 10.

Preferably, in the second embodiment, the second light hole 71 has a diameter smaller than that of the first light hole 11 in the camera lens 10 such that two different amount of light can be selected to enter into the camera lens of the mobile device of the present invention.

It is noted that the driving mechanism in the above embodiments causes movement of the movable aperture sheet 70 or the slidable plate 80 toward and away from the camera lens 10 based on the deformations of shape memory alloy (SMA), piezoelectric elements, magnetostrictive devices, or resilience of elastic elements. Preferably, the two driving members 50, 51 are configured to be linear, stem form or the other suitable shapes having a length.

Preferably, one of the two driving members is fabricated from SMA, piezoelectric elements or magnetostrictive device while the other one of the two driving members is fabricated from SMA, piezoelectric elements, magnetostrictive device or spring.

Also, it is noted that in the above embodiments, the two driving members 50, 51 are non-simultaneously activated. In other words, when one driving member is activated, the other driving member remains at a de-activated position. The activation mentioned above means an external force is applied, for example, electrifying or heating.

In the second embodiment, the movable aperture sheet 70 and the slide plate 80 are separate elements and are coupled in such a manner to be located side-by-side as best shown in FIG. 3.

Figure 4:
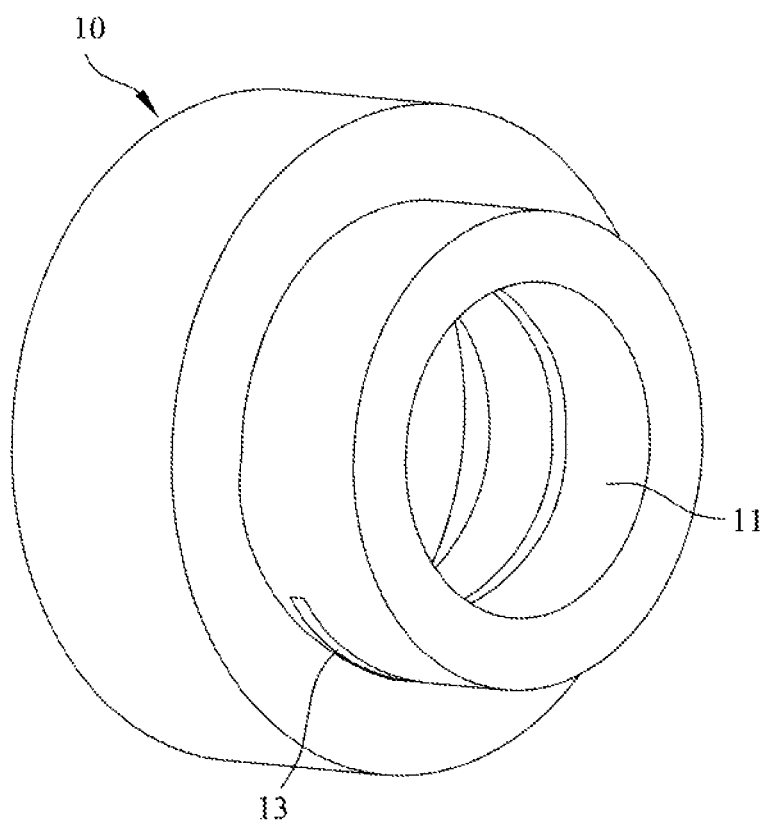
FIG. 4 shows the camera lens of the first embodiment of the present invention.

FIG. 4 shows the first embodiment of the present invention in application, wherein, the camera lens 10 is further formed with a insertion slot 13 on a side wall of the camera lens in spatial communication with the first light hole 11, wherein the movable aperture sheet 70 is adapted to be inserted into the insertion slot 13 such that the second light hole 71 may align with the first light hole 11 in the camera lens 10.

It is noted that FIG. 4 shows a state, where the movable aperture sheet is adapted to be inserted into the camera lens 10 via the insertion slot 13. Of course, the movable aperture sheet can be configured to move relative to an incident side or light output side of the camera lens.

Figure 5:
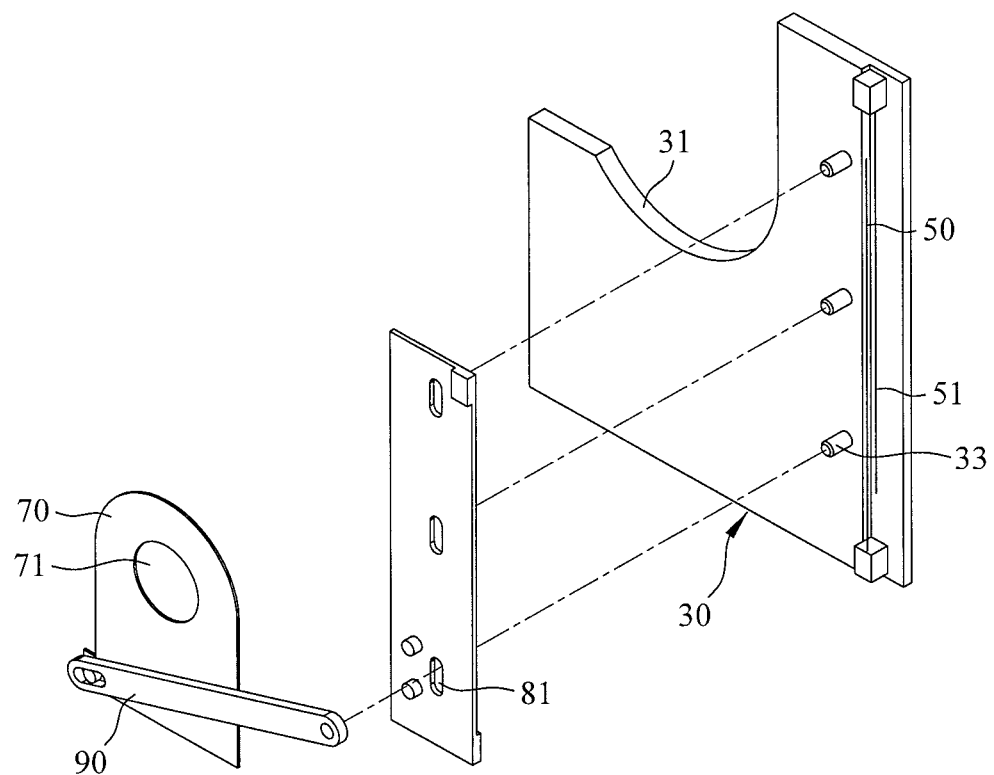
FIG. 5 shows the second embodiment of the present invention.

FIG. 5 shows the second embodiment of the present invention in application further includes a connecting structure 90 interconnecting the slidable plate 80 and the movable aperture sheet, wherein movement of the slidable plate 80 results in pushing the connecting structure 90 by the slidable plate 80, thereby moving the movable aperture sheet 70 on the base 30 by virtue of extension of the guiding stub 33 of the base 30 through the elongated slide slot 81 in the slidable plate 80. In other words, the slide plate 80 is movable reciprocally and limitedly on the base 30 along the elongated slide slot 81.

In each of the two embodiments, two fixing seats 41, 43 are mounted securely on the side surface of the base 30 adjacent to the two opposite end portions such that each of the driving members 50, 51 has an end fixed to the fixing seats 41, 43 so as to facilitate mounting of the driving members 50, 51 on the base 30.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A mobile device with variable aperture function, comprising:
    a camera lens having at least one first light hole to permit a light passing therethrough;
    a base disposed exteriorly to said camera lens; and
    a driving mechanism including two driving members and a movable aperture sheet, wherein each of said driving members has an end fixed on said base and adjacent to two opposite end portions of said base and the other end connected to said movable aperture sheet in such a manner that said movable aperture sheet is located on said base between said two opposite end portions, said movable aperture sheet being formed with at least one second light hole;
    wherein, activation of one of said driving members results in deformation of said one of said driving members, which in turn, causes movement of said movable aperture sheet toward said camera lens, thereby aligning said second light hole in said movable aperture sheet with said first light hole in said camera lens, activation of the other one of said driving members results in deformation of said other one of said driving members, which in turn, causes movement of said movable aperture sheet away from said camera lens, thereby staggering said second light hole in said movable aperture sheet with said first light hole in said camera lens;
    wherein, said second light hole has a diameter different from that of said first light hole such that when said second light hole is aligned with said first light hole, the light passes through said second light hole, and
    wherein said two driving members are non-simultaneously activated.

2. The mobile device according to claim 1, wherein said base supports said camera lens directly or indirectly thereon.

3. The mobile device according to claim 1, wherein said second light hole has a diameter smaller than that of said first light hole.

4. The mobile device according to claim 1, wherein one of said two driving members causes movement of the movable aperture sheet based on the deformations of shape memory alloy (SMA), piezoelectric elements, magnetostrictive devices, or resilience of elastic elements.

5. The mobile device according to claim 1, wherein said two driving members has a linear configuration.

6. The mobile device according to claim 5, wherein the other one of said two driving members causes movement of the movable aperture sheet based on the deformations of shape memory alloy (SMA), piezoelectric elements, magnetostrictive devices, or resilience of elastic elements.

7. The mobile device according to claim 1, wherein said camera lens is further formed with an insertion slot in spatial communication with said first light hole, wherein said movable aperture sheet is adapted to be inserted into said insertion slot such that said second light hole is aligned with said first light hole in said camera lens.

8. A mobile device with variable aperture function, comprising:
    a camera lens having at least one first light hole to permit a light passing therethrough;
    a base disposed exteriorly to said camera lens; and
    a driving mechanism including two driving members and a slidable plate, wherein each of said driving members has an end fixed on said base and adjacent to two opposite end portions of said base and the other end connected to said slidable plate in such a manner that said slidable plate is located on said base between said two opposite end portions;
    a movable aperture sheet coupled to said slidable plate and formed with at least one second light hole;
    wherein, activation of one of said driving members results in deformation of said one of said driving members, which in turn, causes movement of said slidable plate and said movable aperture sheet toward said camera lens, thereby aligning said second light hole in said movable aperture sheet with said first light hole in said camera lens, activation of the other one of said driving members results in deformation of said other one of said driving members, which in turn, causes movement of said slidable plate and said movable aperture sheet away from said camera lens, thereby staggering said second light hole in said movable aperture sheet with said first light hole in said camera lens;
    wherein, said second light hole has a diameter different from that of said first light hole such that when said second light hole is aligned with said first light hole, said light passes through said second light hole, and
    wherein said two driving members are non-simultaneously activated.

9. The mobile device according to claim 8, wherein said base supports said camera lens directly or indirectly thereon.

10. The mobile device according to claim 8, wherein said second light hole has a diameter smaller than that of said first light hole.

11. The mobile device according to claim 8, wherein one of said two driving members causes movement of the movable aperture sheet and the slidable plate based on the deformations of shape memory alloy (SMA), piezoelectric elements, magnetostrictive devices, or resilience of elastic elements.

12. The mobile device according to claim 8, wherein said two driving members has a linear configuration.

13. A mobile device with variable aperture function, comprising:
- a camera lens having at least one first light hole to permit a light passing therethrough;
- a base disposed exteriorly to said camera lens; and
- a driving mechanism including two driving members and a slidable plate, wherein each of said driving members has an end fixed on said base and adjacent to two opposite end portions of said base and the other end connected to said slidable plate in such a manner that said slidable plate is located on said base between said two opposite end portions;
- a movable aperture sheet coupled to said slidable plate and formed with at least one second light hole;
- a connecting structure interconnecting said slidable plate and said movable aperture sheet, wherein activation and movement of said slidable plate results in pushing said connecting structure by said slidable plate, thereby moving said movable aperture sheet, wherein, activation of one of said driving members results in deformation of said one of said driving members, which in turn, causes movement of said slidable plate and said movable aperture sheet toward said camera lens, thereby aligning said second light hole in said movable aperture sheet with said first light hole in said camera lens, activation of the other one of said driving members results in deformation of said other one of said driving members, which in turn, causes movement of said slidable plate and said movable aperture sheet away from said camera lens, thereby staggering said second light hole in said movable aperture sheet with said first light hole in said camera lens, and wherein, said second light hole has a diameter different from that of said first light hole such that when said second light hole is aligned with said first light hole, said light passes through said second light hole.

14. The mobile device according to claim 8, wherein said camera lens is further formed with an insertion slot in spatial communication with said first light hole, wherein said movable aperture sheet is adapted to be inserted into said insertion slot such that said second light hole is aligned with said first light hole in said camera lens.

* * * * *